Feb. 19, 1924.
H. SPENCER
TOOL HOLDER
Filed July 17, 1920
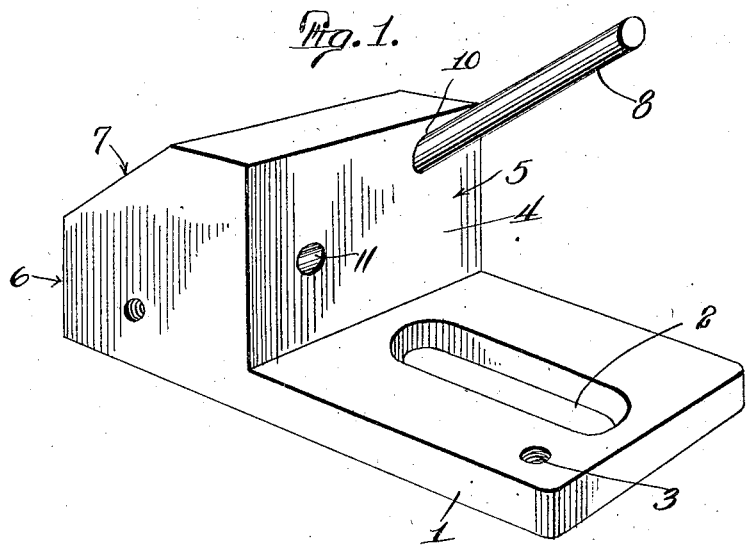
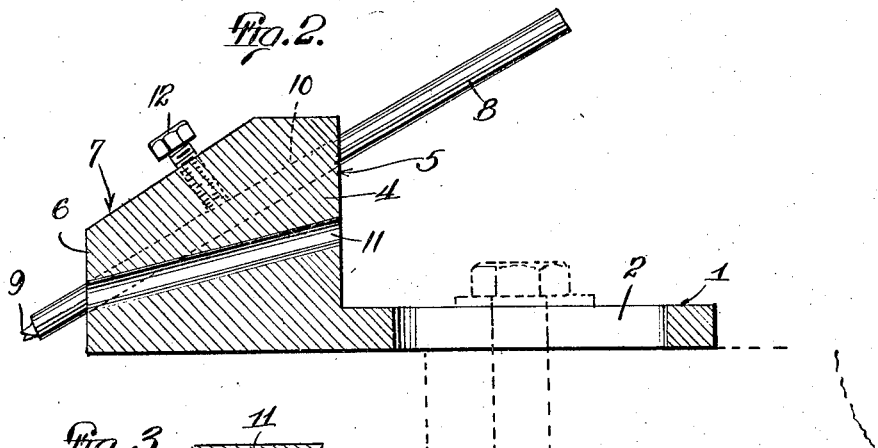
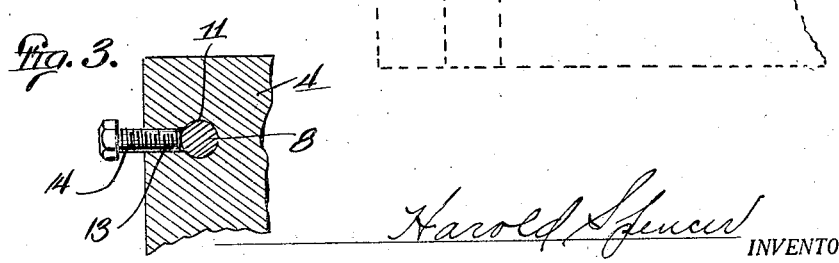
Harold Spencer INVENTOR.

Patented Feb. 19, 1924.

1,484,310

UNITED STATES PATENT OFFICE.

HAROLD SPENCER, OF DETROIT, MICHIGAN.

TOOL HOLDER.

Application filed July 17, 1920. Serial No. 397,117.

*To all whom it may concern:*

Be it known that I, HAROLD SPENCER, a citizen of the United States, residing at Detroit, in the county of Wayne and State of Michigan, have invented certain new and useful Improvements in a Tool Holder, of which the following is a specification.

This invention relates to tool holders and more particularly to a holder for diamond pointed tools especially adapted for dressing emery wheels and the like.

The primary object of the invention is to provide a tool holder of this character which may be mounted in position on a grinding machine in a manner that will eliminate any vibration and chatter of the tool during the dressing process of the wheels.

Another object of the invention is to provide a device which will produce a smooth grinding surface and permit the tool to be used at different angles thereby increasing the life of the tool and producing a more uniform surface on the emery wheel.

The invention further aims to provide a tool holder which will permit the keenest cutting point of the tool to be used at all times thereby increasing the life of the tool and preventing damage by breaking and burning of the tool point.

Other objects of the invention will appear upon consideration of the following detail description and accompanying drawings, wherein:—

Figure 1 is a perspective view of the tool holder constructed in accordance with my invention.

Figure 2 is a transverse section through the same, and

Figure 3 is a fragmentary section through a portion of the same.

Referring to the drawings wherein is illustrated the preferred form of the invention, the base plate 1 is adapted to be mounted in any convenient manner on a grinding machine or other machine employed to hold tools during the grinding process. A longitudinal slot 2 is provided in the base plate whereby a fastening bolt may be employed to firmly secure the base plate in position. A screw threaded opening 3 is also provided in the base plate whereby an auxiliary set screw may be utilized to more effectively maintain the base plate in rigid position. At one end of the base plate is provided an enlarge block 4 which provides a tool head having the vertical face 5 at one side and a vertical face 6 at the opposite side while the top is provided with an angular surface 7. The tool comprises a shank 8 having the diamond point 9 of the type generally employed by mechanics for the purpose of dressing the surface of emery wheels. The shank 8 of the tool is adapted to extend through openings 10 and 11 provided in the head 4. The opening 10 is disposed at an angle of 30° and the opening 11 is disposed at an angle of approximately 18°. Each of the openings extend from the surface 5 to the surface 6 as shown to advantage in Fig. 2 and they are both of a size to conveniently receive the shank of the tool so that the tool may be disposed in either of the openings. When the tool is mounted in the opening 10 as shown in Figs. 1 and 2 a set screw 12 is employed to maintain the tool tightly in position and this set screw projects through a screw threaded opening leading from the surface 7 to the opening 10. The opening 11 being of a less angle communicates with the transverse screw threaded opening 13 adapted to receive a set screw 14 whereby the shank of the tool may be held in fixed position when the same is mounted in the opening 11 as shown in Fig. 3.

It will be obvious that the tool shank, when disposed in the position shown in Figs. 1 and 2 will cause the diamond point to engage the wheel at a certain angle and the tendency will be to wear the point of the tool until it tends to become dull and less effective in the dressing operation. When this happens the shank of the tool is removed from the opening 10 and placed in the opening 11 and fixed by the set screw 14. Thus the tool will have its point 9 disposed at a different angle and the engagement of the point with the emery wheel at this different angle, will improve the cutting operation since the dull portion will be out of engagement with the surface of the wheel.

The general structure above referred to embodies the preferred form of the invention but it will be understood that the device may be modified to be applied to other grinding machines with suitable fixtures. The tool will be held properly and securely during the time the wheel is being dressed and the life of the point may be materially increased while the dressing operation will be more quickly effected. Vibrations and chatter of the tool and wheel, which so often occurs in using the ordinary holder will be eliminated by using the present device and a material saving in the cost of tool points will be effected.

What I claim is:—

1. A tool holder and tool comprising a base plate provided with a tool head at one end, said head being equipped with transverse openings disposed at different angles with respect to the surface of the base plate and with respect to each other, the said openings being of a size to conveniently receive the tool and means to fasten the tool in either of the openings.

2. A tool holder and tool comprising a base plate and a tool head formed on the base plate having vertical sides, the said tool head being provided with transversely extending openings disposed at different angles with respect to each other, each of the openings being adapted to receive the tool whereby the tool shank may be interchanged in the openings for disposing the point of the tool at different angles, and means to fasten the shank of the tool in fixed position in the tool head.

3. A tool holder comprising a base plate provided with a tool head at one end and equipped with a longitudinal slot, means to permit the base plate to be fastened to the slot, the said tool head having vertical faces and angular top face, the said tool head also having angularly disposed openings disposed at different angles with respect to each other and extending from the rear vertical face to the front vertical face, and fastening elements adapted to maintain the tool in position in either of the said angularly disposed openings.

4. A tool holder of the class described having openings to receive tools, said openings being disposed at different angles so the sharpest edge of the tool may be positioned to engage the work.

In testimony whereof, I have affixed my signature in the presence of two witnesses.

HAROLD SPENCER.

Witnesses:
OLIVER E. DAY,
A. L. CHAMBERS.